(12) United States Patent
Ansell

(10) Patent No.: US 11,787,095 B2
(45) Date of Patent: Oct. 17, 2023

(54) MOLD AND METHOD FOR MOLDING A BODY OR CAP FOR A CONNECTOR

(71) Applicant: John Guest International Limited, Middlesex (GB)

(72) Inventor: Glen Ansell, Middlesex (GB)

(73) Assignee: JOHN GUEST INTERNATIONAL LIMITED, Middlesex (GB)

( * ) Notice: Subject to any disclaimer, the term of this patent is extended or adjusted under 35 U.S.C. 154(b) by 248 days.

(21) Appl. No.: 17/415,411

(22) PCT Filed: Dec. 13, 2019

(86) PCT No.: PCT/GB2019/053546
§ 371 (c)(1),
(2) Date: Jun. 17, 2021

(87) PCT Pub. No.: WO2020/128439
PCT Pub. Date: Jun. 25, 2020

(65) Prior Publication Data
US 2022/0063163 A1 Mar. 3, 2022

(30) Foreign Application Priority Data

Dec. 20, 2018 (GB) ...................................... 1820824

(51) Int. Cl.
*B29C 45/44* (2006.01)
*B29C 45/26* (2006.01)
*B29C 45/36* (2006.01)
*B29L 31/36* (2006.01)

(52) U.S. Cl.
CPC ........ *B29C 45/4421* (2013.01); *B29C 45/261* (2013.01); *B29C 45/2602* (2013.01);
(Continued)

(58) Field of Classification Search
CPC ... B29C 33/485; B29C 33/76; B29C 45/2602; B29C 45/261; B29C 45/36; B29C 45/44;
(Continued)

(56) References Cited

U.S. PATENT DOCUMENTS

| 5,387,389 A | 2/1995 | Catalanotti et al. |
| 6,079,973 A * | 6/2000 | Manera ............... B29C 45/2681 264/318 |

(Continued)

FOREIGN PATENT DOCUMENTS

| CH | 398214 A | 8/1965 |
| DE | 2419991 A1 | 10/1975 |

(Continued)

OTHER PUBLICATIONS

PCT International Search Report for PCT Application No. PCT/GB2019/053546 dated Mar. 16, 2020 (4 pages).

(Continued)

*Primary Examiner* — Thu-Khanh T. Nguyen
(74) *Attorney, Agent, or Firm* — Barnes & Thornburg LLP

(57) ABSTRACT

A mold for molding a body or cap for a connector. The mold comprises a mold body (1) and an axial core (2) which together define a mold cavity in the shape of the body or cap. The core has a sleeve (3) and an inner pin (4) each having complementary castellations (8, 10) which interdigitate in a first configuration. In the first configuration, the castellations (8, 10) are arranged such that respective recesses (11) are formed each bound by the proximal end of a first castellation (8) and the side walls of adjacent second castellations (10). Each recess has a shape to form a respective first portion of the body or cap. The sleeve (3) and inner pin (4) are axially movable to a second configuration in which the castellations (8, 10) are disengaged from one another. The inner pin (4)

(Continued)

is rotatable to a third configuration in which the first castellations (8) can be axially withdrawn following a path occupied by the second castellations (10) in the first configuration.

6 Claims, 11 Drawing Sheets

(52) U.S. Cl.
CPC ........ *B29C 45/36* (2013.01); *B29C 2045/366* (2013.01); *B29C 2045/4485* (2013.01); *B29L 2031/36* (2013.01)

(58) Field of Classification Search
CPC ............ B29C 45/4421; B29C 45/7626; B29C 2045/366; B29C 2045/4485
See application file for complete search history.

(56) References Cited

U.S. PATENT DOCUMENTS

| | | |
|---|---|---|
| 2009/0046377 A1 | 2/2009 | Omi |
| 2017/0326768 A1 | 11/2017 | Zeik et al. |

FOREIGN PATENT DOCUMENTS

| | | |
|---|---|---|
| EP | 0934811 A2 | 8/1999 |
| EP | 1895342 A1 | 3/2008 |
| EP | 2860436 A1 | 4/2015 |
| ES | 2074394 A2 | 9/1995 |
| GB | 753284 | 7/1956 |
| GB | 1342283 | 1/1974 |
| WO | 99/34142 A1 | 7/1998 |
| WO | 98/56674 A1 | 12/1998 |
| WO | 03/031861 A1 | 4/2003 |
| WO | 2008/102229 A1 | 8/2008 |

OTHER PUBLICATIONS

PCT Written Opinion for PCT Application No. PCT/GB2019/053546 dated Mar. 16, 2020 (9 pages).

Great Britain Search Report for GB Application No. 1820824.9 dated Jun. 19, 2019 (2 pages).

Office Action; Chinese Patent Application No. 201980092733.3; dated May 7, 2023.

* cited by examiner

MOLD AND METHOD FOR MOLDING A BODY OR CAP FOR A CONNECTOR

This application is a National Stage Application of PCT/GB2019/053546, filed 13 Dec. 2019, which claims benefit of Serial No. 1820824.9, filed 20 Dec. 2018 in Great Britain and which application(s) are incorporated herein by reference. To the extent appropriate, a claim of priority is made to each of the above disclosed applications.

The present invention relates to a mold and method for molding a body or cap for a connector.

The type of connector with which the present invention is primarily concerned is a quick release connector having a body which contains a collet and has a cap angle in the body in the form of an angled surface within the body. When a pipe or cable is inserted into the connector, there are teeth on the collet which engage with the pipe or cable such that a movement of the pipe or cable out of the connector causes the collet to be moved along the cap angle thereby urging the teeth inwardly creating an inwardly directed gripping force on the cable or pipe which increases with the increasing force being applied to the pipe or cable to prevent it from being removed.

Such connectors have found widespread applications for connecting plastic tubes and the like, for example, in plumbing, electrical cables and fiber optic applications. They provide a quick and reliable method of joining two cables together or connecting a cable to another component. The internal profile of the body is relatively complex and, traditionally, the body has been provided with a separate cap which usually includes the cap angle. The cap is usually sonically welded to the body, or a cap which is attached with a screw thread. Whilst this has been very successful commercially, it does have a number of draw backs in that the welding process requires complex equipment, the materials of the cap and body must be compatible to ensure that they are suitable for welding and the components must be sufficiently thick and robust to allow the welding. There have been many numbers of attempts to address this problem.

EP2860436 discloses a snap-on cap. Because of limitations in the manufacturing method, the face which forms the snap fit is a tapered surface which, when subjected to a high force, provides a ramp surface which can cause disassembly of the connector.

We previously considered the idea of a two part molding tool where the two parts are axially moveable with respect to one another. One of the parts has a pair of blades which enter from the distal end of the cap in order to form a surface in a radial plane rather than the tapered surface of EP2860436. Although this solves the problem with the snap fit, the resulting connector has a pair of openings in the distal end (formed by the blades) which are unsightly in use and can provide a passage for the ingress of dirt into the connector.

Another attempt we have made to solve this problem disposes with the separate cap entirely and proposes a one part body. This time, the cap angle is molded into the wall of the body using a molding tool with a collapsible core. The molding process occurs with the collapsible core in an expanded configuration with a number protrusions which extend radially into the mold cavity. Following the molding step, the core pin is collapsed moving the protrusions radially inwardly such that the collapsed pin can be withdrawn from the mold.

This is a relatively complex molding tool. Furthermore, the caps described in relation to GB1802854.8 above have annular recess between inner and outer walls. Even if the cap is not provided with the orifices at its distal end as described above, the annular recess is beneficial as the cap is supported by both an internal and an external surface of the body such that it is firmly held in place. However, a cap with such an annular recess cannot be produced by the collapsing core method as described above. The collapsible core also cannot be used for small components as there is a size limit below which there is no room for the core to collapse inwardly.

There is therefore a need for a mold and a method for molding the body or cap which reduces the complexity of the collapsing core method as described above, and which can also be used to produce a cap having an annular recess between inner and outer walls.

According to the present invention there is provided a mold for molding a body or cap according to claim 1.

With this mold, rather than a collapsing core pin, which requires a complex mechanism, the present invention requires only that the outer sleeve and inner pin are rotatable and axially movable with respect to one another. Thus, the movement required to remove the core from the molded body or cap and the associated mechanism can be greatly simplified.

Further, because the movement of the inner pin is a rotational movement, followed by an axial movement, this mold is able to produce the annular recess for the cap described in GB1802854.8 above. As there is no collapsing movement, the mold can be used for smaller components.

The mold may be suitable for molding either a body or a cap. The exact configuration of the first and second castellations and hence the nature of the first and second portions formed can be varied accordingly.

For example, the first and second portions may be formed at the one open end. In this case, the first portions may be inward projections and the second portions are the gaps between the projections thereby defining an intermediate lip around the open end of the body or cap. In the case of the cap, this intermediate lip can be the clip to attach the cap to an underlying body. This manufacturing technique allows the intermediate lip to be made with the face facing away from the open end which is in a radial plane. This solves the problem mentioned above in EP2860436.

As another example which is particularly applicable to molding a body, the first portion represents a reduced inner diameter of the body or cap axially adjacent to recesses in the body or cap and the second portions are increased inner diameter portions between the first portions to provide a path to withdraw the core. The recesses are preferably formed with a cap angle. This replicates the technique described above of a collapsible core in that it allows a cap angle to be molded directly into the wall of the body. However, as set out above, this can be done without the complex mechanism required to collapse the core and also allows smaller bodies to be formed.

One of the outer sleeve and inner pin is preferably provided with a cam groove and the other of the outer sleeve and inner pin is provided with a cam follower to allow the axial and rotational motion between the two. This provides a simple and reliable way of obtaining the necessary axial and rotational movement in the correct sequence and also means that an actuator is only required to move one of the two components in an axial direction allowing the cam arrangement to automatically provide rotational movement at the right time. This contrasts with the complex mechanism required for the collapsible core referred to above.

The present invention also extends to a method for molding a body or cap for a connector according to claim 6.

This method provides the advantages referred to above in relation to claim 1.

Examples of caps and connectors produced according to the mold and method of the present invention will now be described with reference to the accompanying drawings, in which.

Figure 1A:
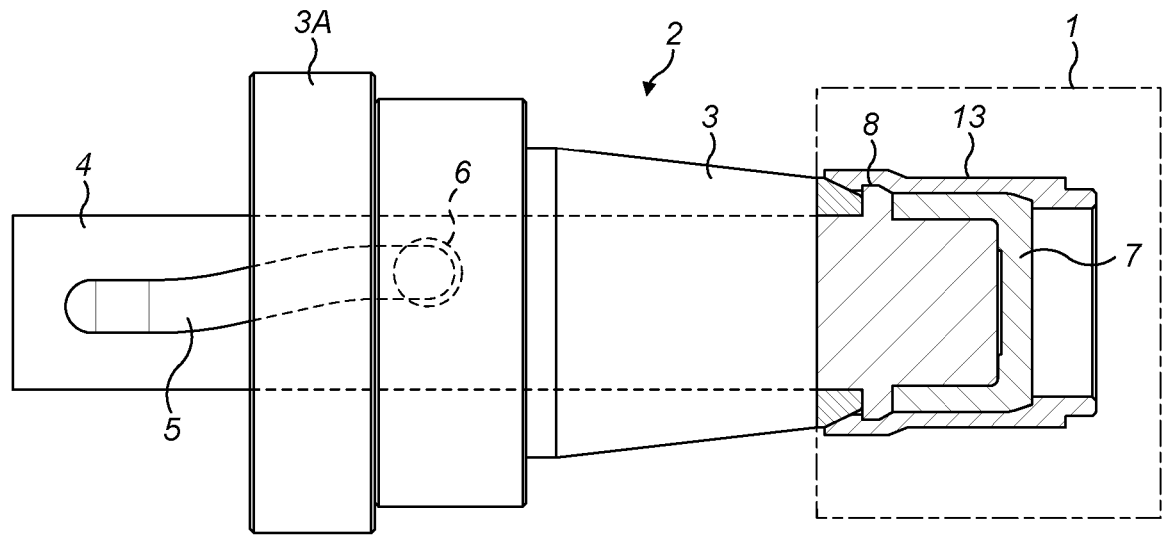
FIG. 1A is a partial cross-section of a first example for forming a cap of the mold core with the outer sleeve and inner pin in a first configuration (the mold body is also illustrated schematically)

The mold of FIG. 1 consists of a mold body 1 which has a conventional construction and will not be described in the present specification and an axial core 2 as described in greater details below.

The axial core 2 comprises an outer sleeve 3 with an retaining sleeve 3A and an inner pin 4 which are coupled together via a cam groove 5 on the inner pin 4 and one or more cam followers 6 in the form of a ball bearing trapped by the retaining sleeve 3A on the outer sleeve 3 such that they move relative to one another as set out below.

The distal end of the axial core 2 is provided with a number of features which define the shape of the mold cavity as described below.

At its distal end, the inner pin 4 is provided with a rotatable annular cap 7 rotatably mounted on the end of the inner pin 4 so as to rotate about the axis of the inner pin 4. A rotary bearing (not shown) may be provided between the inner pin 4 and annular cap 7 so as to facilitate this rotation. On the inner pin 4 immediately adjacent an open end of the annular cap 7 are, a plurality of first castellations 8 extending radially from inner pin 4, the castellations 8 having an end face 9 which is in a radial plane as described in greater detail below.

The outer sleeve 3 is provided with a plurality of distally extending second castellations 10 which are complimentary to the first castellations 8. As can best be seen in FIGS. 1B and 1F, the first castellations 8 are axially shorter than the second castellations 10 such that a cavity 11 is created in the space between a pair of second castellations 10, the axial end face 9 of a first castellation and the axial end face of the outer sleeve 3 between the second castellations 10. The castellations 10 extend radially at least as far as the first castellations 8. This axial end face is provided with an inclined face 12 as described in greater detail below.

Figure 1B:
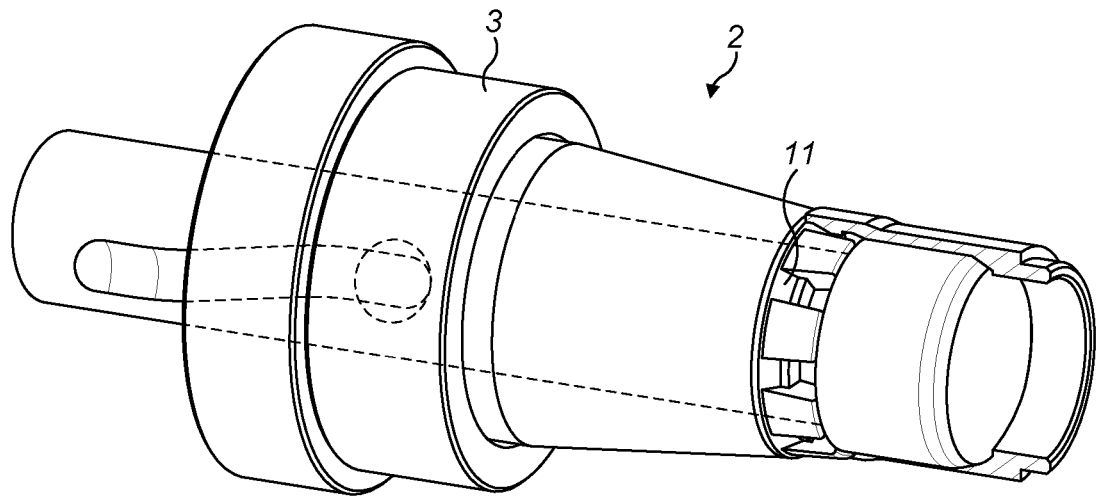
FIG. 1B is a perspective view, partially cut away of the core of FIG. 1A.

With the axial core 2 in the configuration shown in FIG. 1B with the first 8 and second 10 castellations interdigitated as shown, the axial core 2 is inserted into mold body 1. This defines the shape of the mold cavity 13 into which plastic is injected in a well-known manner to form the cap 14.

The cap 14 is formed with a plurality of inwardly extending projections 17. As best shown in FIG. 1E, these have an inwardly facing surface 18 in a radial plane which is formed by a respective end face 9 of a respective first castellation 8. The opposite end of a projection 17 is an inclined face 19 formed by the inclined end face 12 of the outer sleeve 3. The projections 17 are arranged intermittently around an open end of the cap 17 and provide a snap fit connection onto a body such that the inwardly facing surfaces 18 are the faces which engage on a corresponding surface of the body.

The manner in which the axial core 2 is extracted from the cap 14 will be described. As the mold tool opens to separate the mold body 1 from the axial core, the outer sleeve 3 moves axially in relation to the inner pin 4 from the position shown in FIG. 1B to the position shown in FIG. 1C as depicted by arrow 20. At this time, the cam follower 6 moves along an axial portion of the cam groove 5 such that the outer sleeve 3 and inner pin 4 separate axially from one another thereby separating the first 8 and second 10 castellations.

Figure 1C:
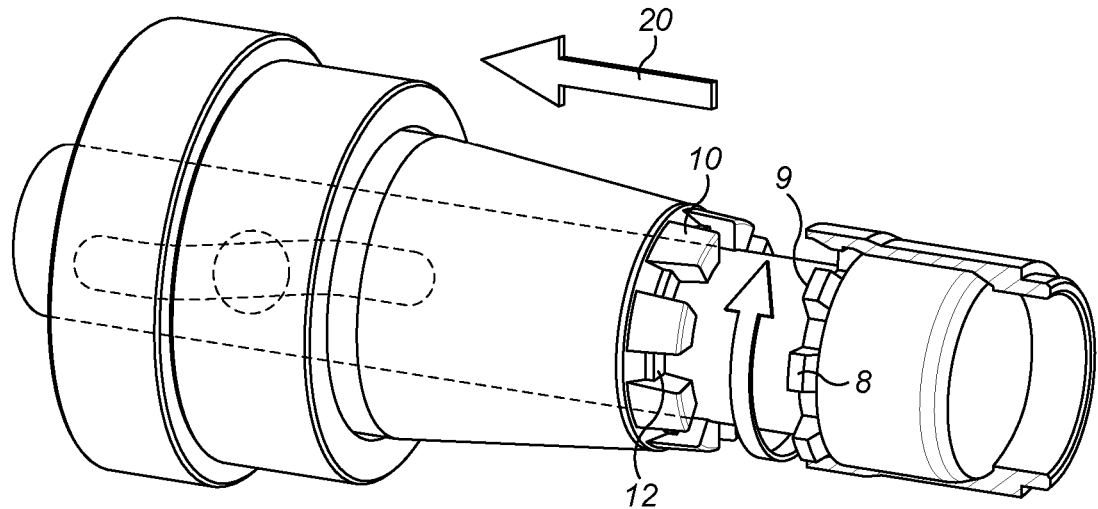
FIG. 1C is a view similar to FIG. 1B showing the outer sleeve and inner pin in a second configuration.
Figure 1D:
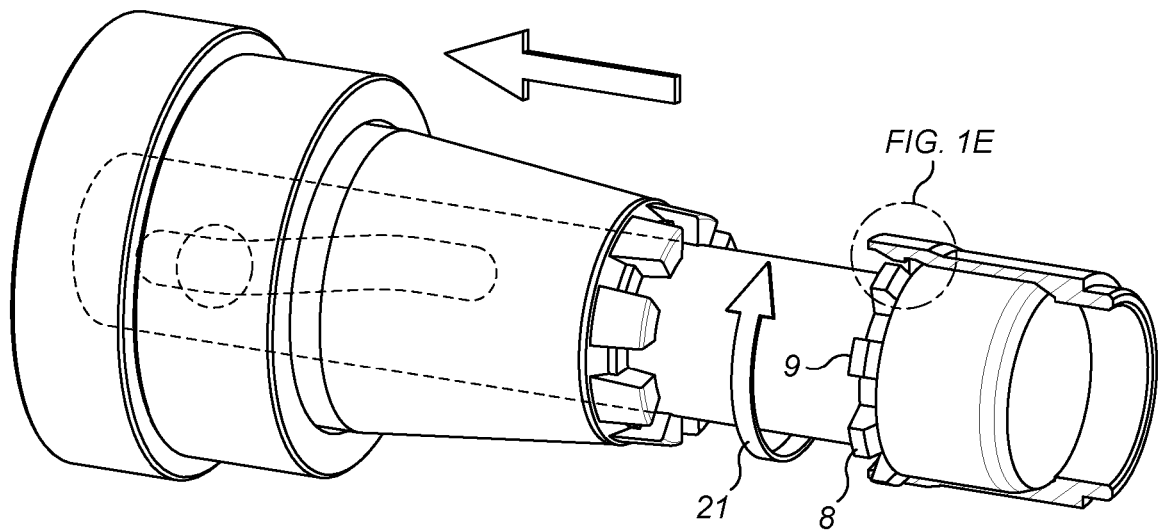
FIG. 1D is a view similar to FIG. 1C showing the outer sleeve and inner pin in a third configuration.
Figure 1E:
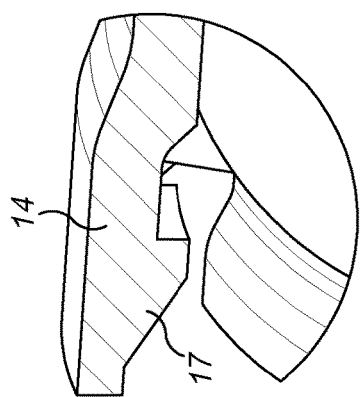
FIG. 1E shows a details of the cap shown in FIG. 1D as represented by the arrow in FIG. 1E.
Figure 1F:
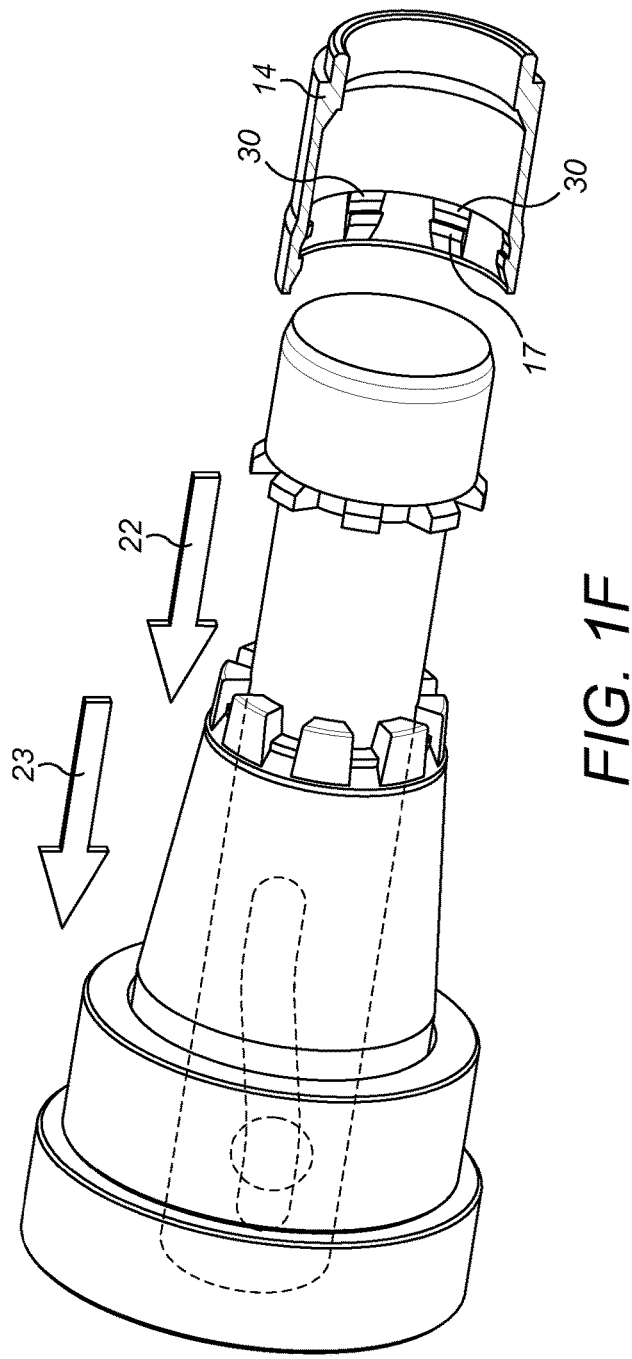
FIG. 1F is a view similar to FIG. 1D showing the core withdrawn from the cap.
Figure 1G:
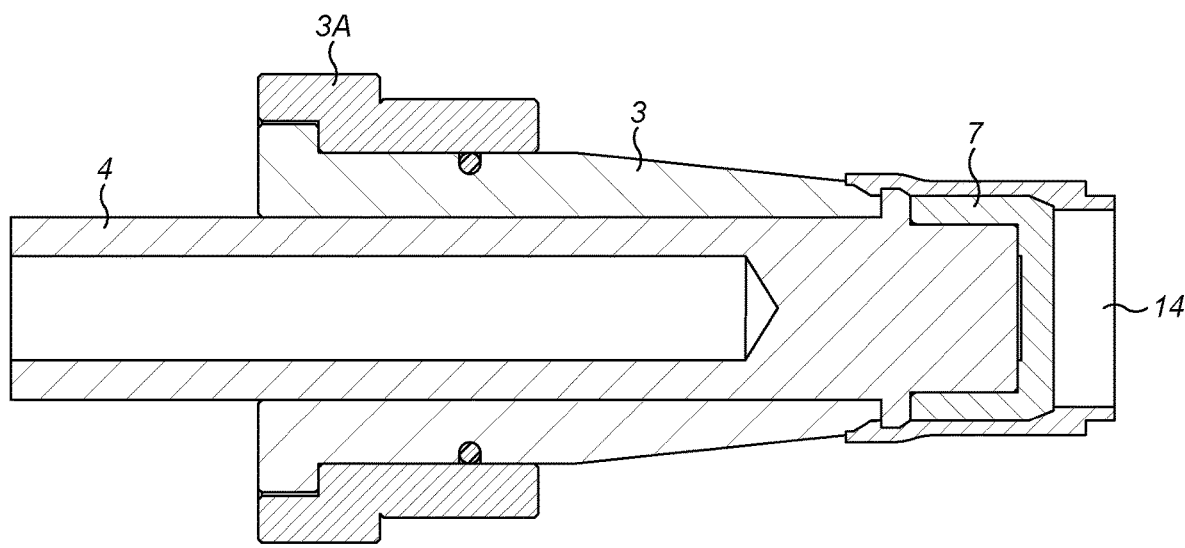
FIG. 1G is a cross-section corresponding to the partial cross-section of FIG. 1A.
Figure 1I:
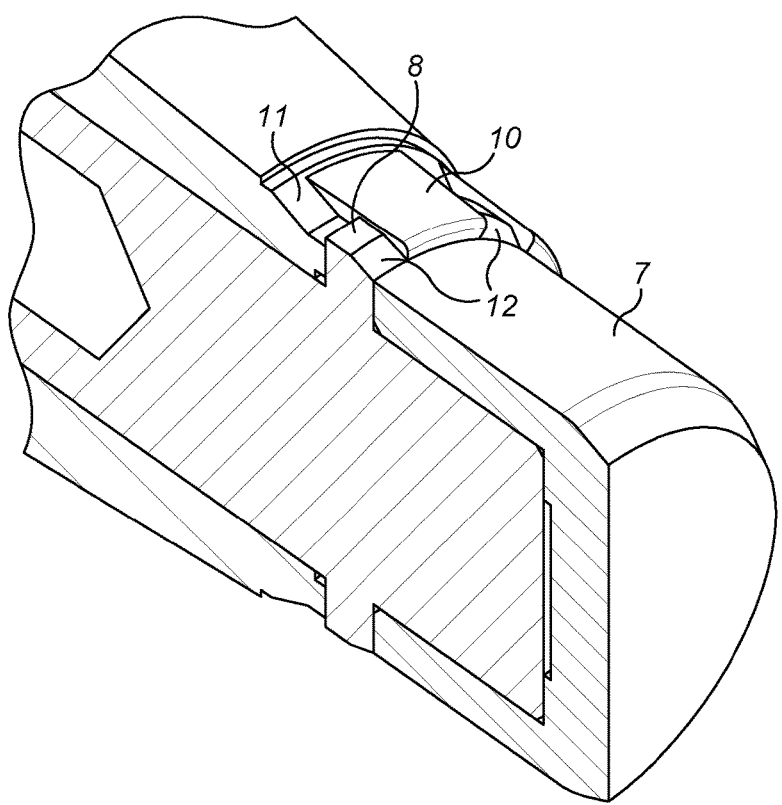
FIG. 1I is a cut away perspective view similar to the partially cut away view of FIG. 1B.
Figure 1J:
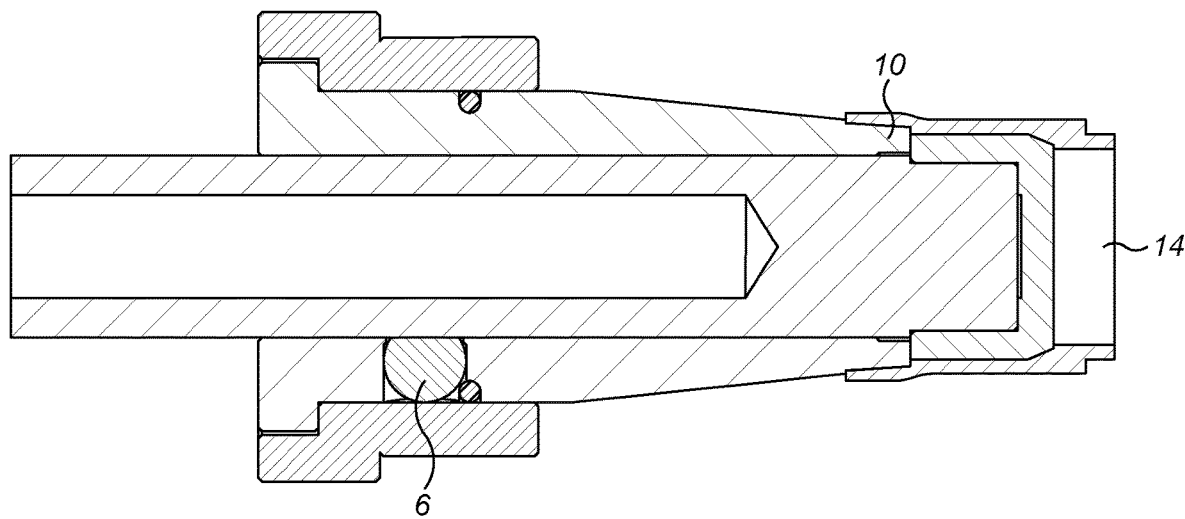
FIG. 1J is similar to FIG. 1G, but shows a section in a plane passing through the second castellations 10.
Figure 1K:
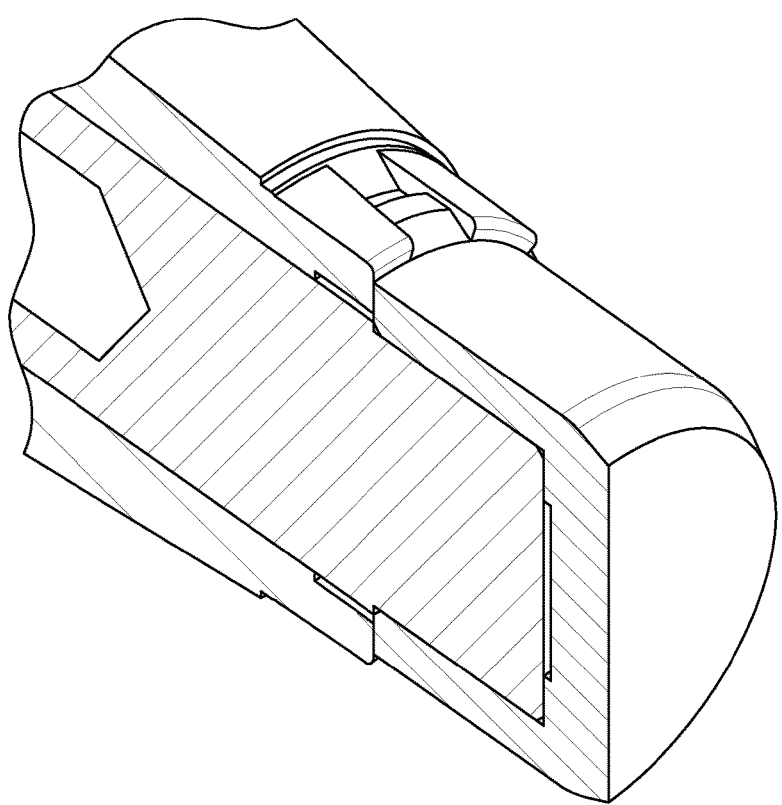
FIG. 1K is a view similar to FIG. 1I taken in the plane of FIG. 1J.

When the castellations 8, 10 are clear of one another, further movement of the outer sleeve 3 causes the cam follower 6 to enter an inclined portion of the cam groove 5 causing relative rotation between the outer sleeve 3 and inner pin 4 as depicted by arrow 21 which represents the rotational movement from the position shown in FIG. 1C to the position shown in FIG. 1D. The outer sleeve 3 is prevented from rotating such that effect of the relative movement is to rotate the inner pin 4 such that the distal end of the inner pin 4-rotates within the collar 7. This rotational movement brings the first castellations 8 into a radial position in which they are now aligned with gaps between inwardly projecting flanges 17. Because the inner pin 4 rotates within the cap 7, the only rotating parts in contact with the mounted component are the first castellations 8 which have a relatively small area. These castellations immediately move into the space created by the second castellations 10. In order to further facilitate this rotational movement, the first castellations 8 may have a slight taper in the direction of rotation so that, as they rotate, the outer surface of the castellations begin to separate from the mounted cap 14. This will allow reliable rotation of the inner pin 4 which will accommodate the shrinkage of the cap 14 which occurs during the molding process. Further axial movement in the direction of arrows 22 and 23 pulls the distal end of the inner pin 4 out of the cap 14.

Figure 2A:
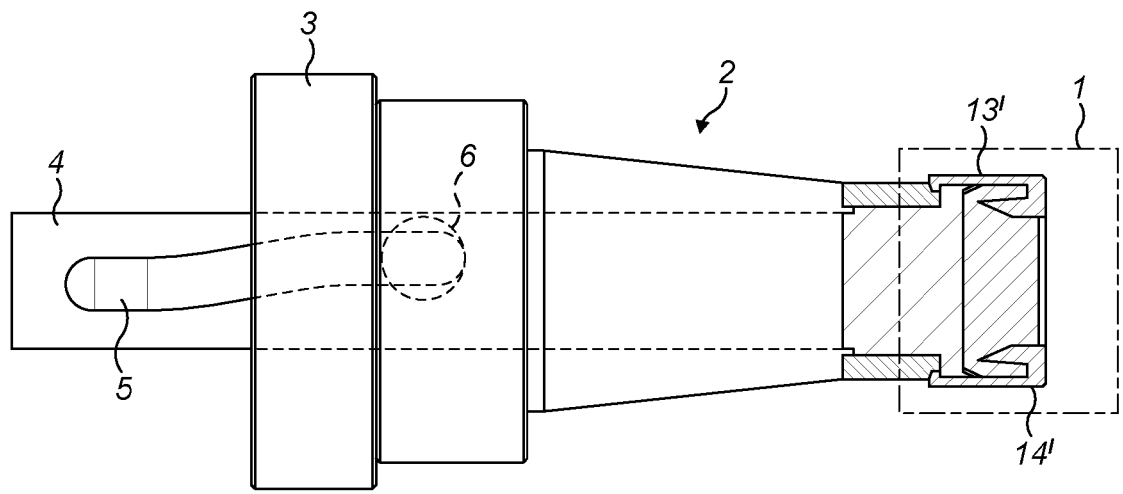
FIGS. 2A to 2F are views similar to FIGS. 1A to 1F showing a second example of a mold and method.
Figure 2B:
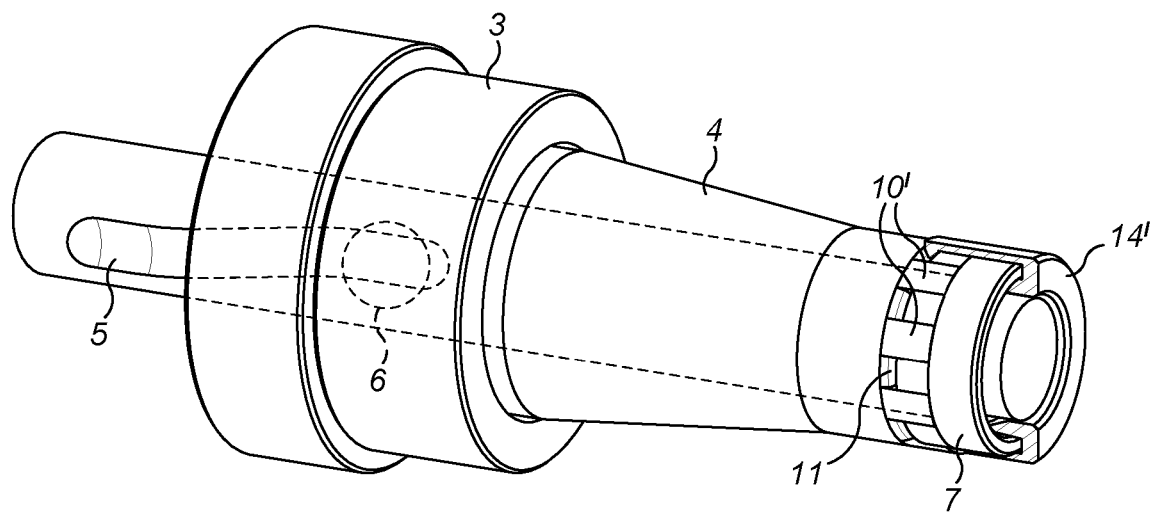
Figure 2C:
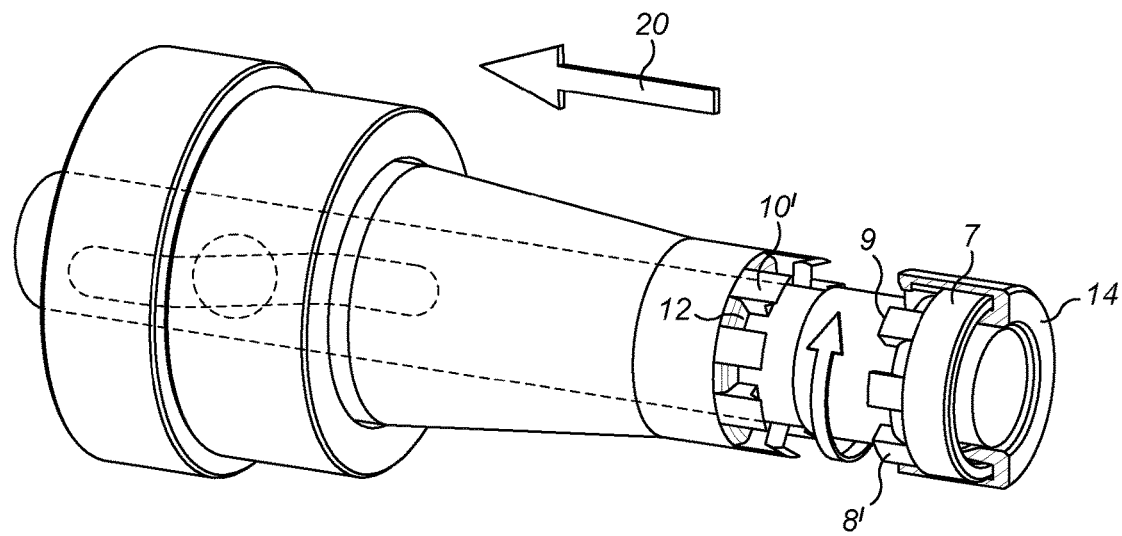
Figure 2D:
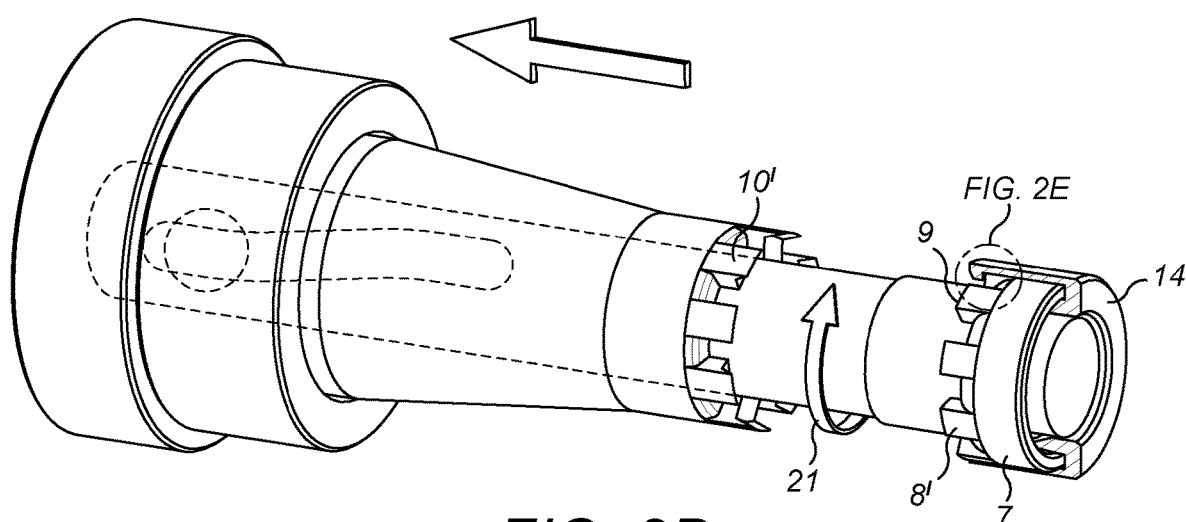
Figure 2E:
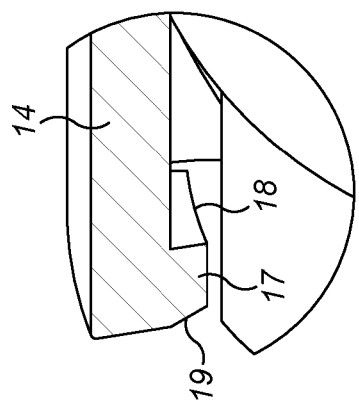
Figure 2F:
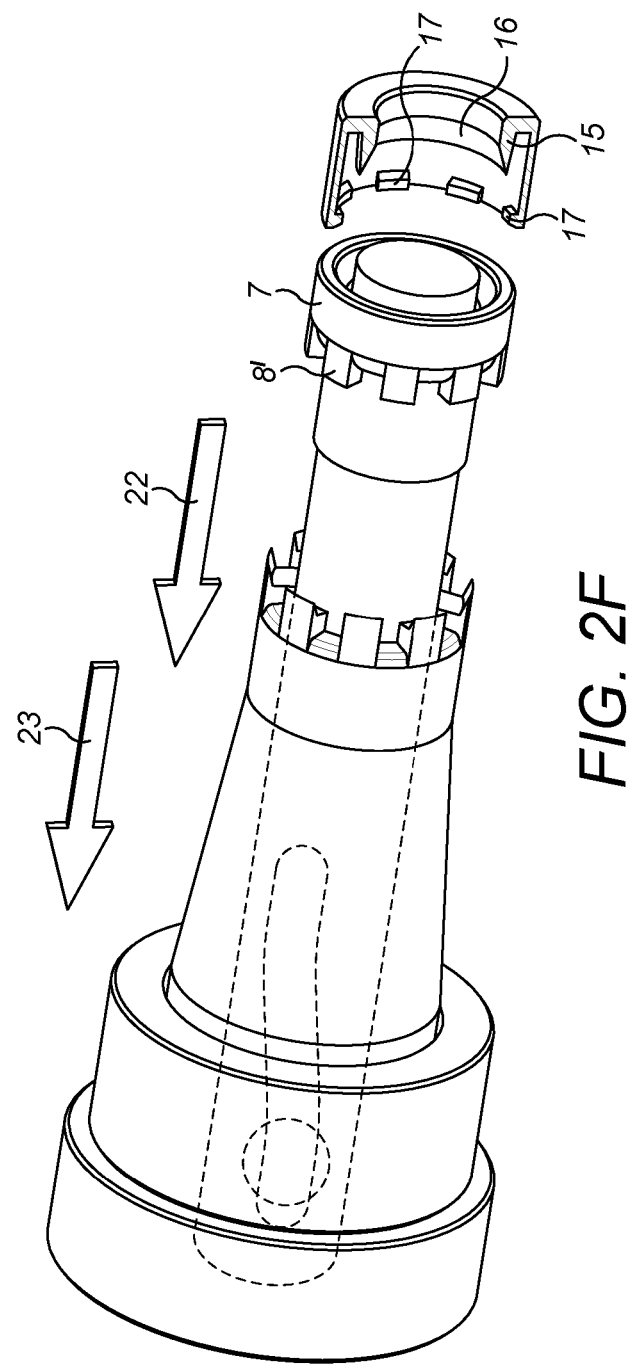

A second example of a mold is shown in FIG. 2A. The principles surrounding the operation of this mold are the same as with the first example and the same reference numerals have been used to designate the same components. The differences reside in the shape of the mold cavity 13' and a particular configuration of the first 8' and second 10' castellations.

As shown in the drawings, the cap 14 has an inner annular lip 15 with an inclined face 16 which is formed by the shape of the collar 7 and forms the cap angle when the cap 14 is attached to a body.

The third example shown in FIG. 3 shows the formation of a double ended body 40. This is formed as a single molded component which does not require a separate cap to be provided as the cap angle 41 is molded directly into the wall of the body 40. The mold body surrounding the axial core 2 is provided as two semi-circular mold parts which are brought together to form the outer face of the body.

Although the body 40 is double-ended, FIGS. 3A to 3F only show an axial core 2 for the left hand end. The opposite end is formed simultaneously using a similar axial core. The described technique may be applied to a single ended body or it may be applied to a double-ended body at one end with a different technique being used to form the opposite end.

Figure 3A:
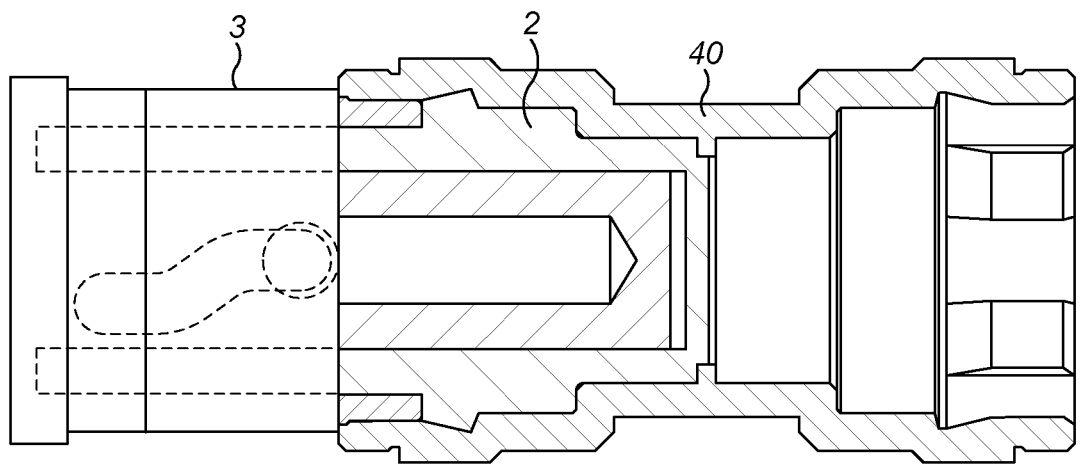
FIGS. 3A to 3F are views similar to FIGS. 1A to 1F showing a third example of a mold and method.
Figure 3B:
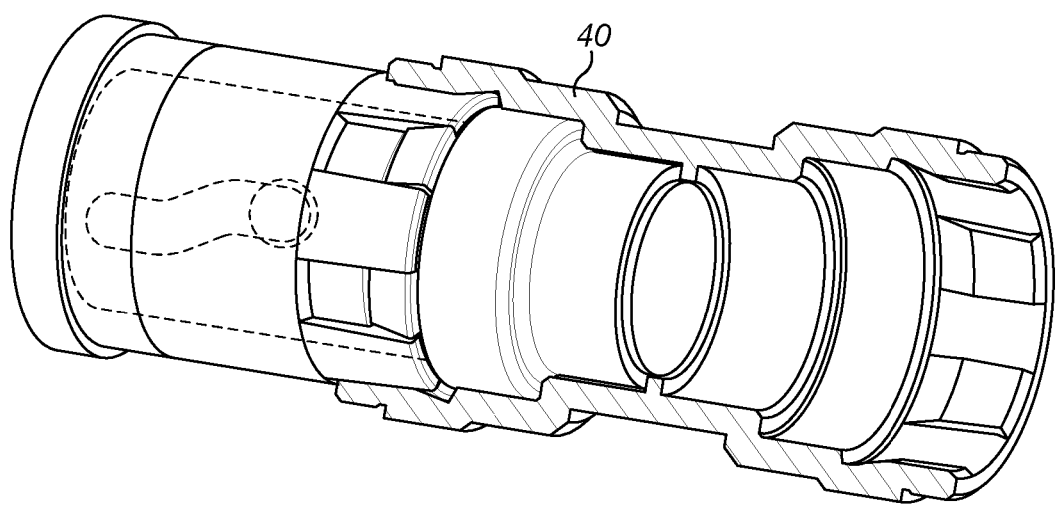
Figure 3C:
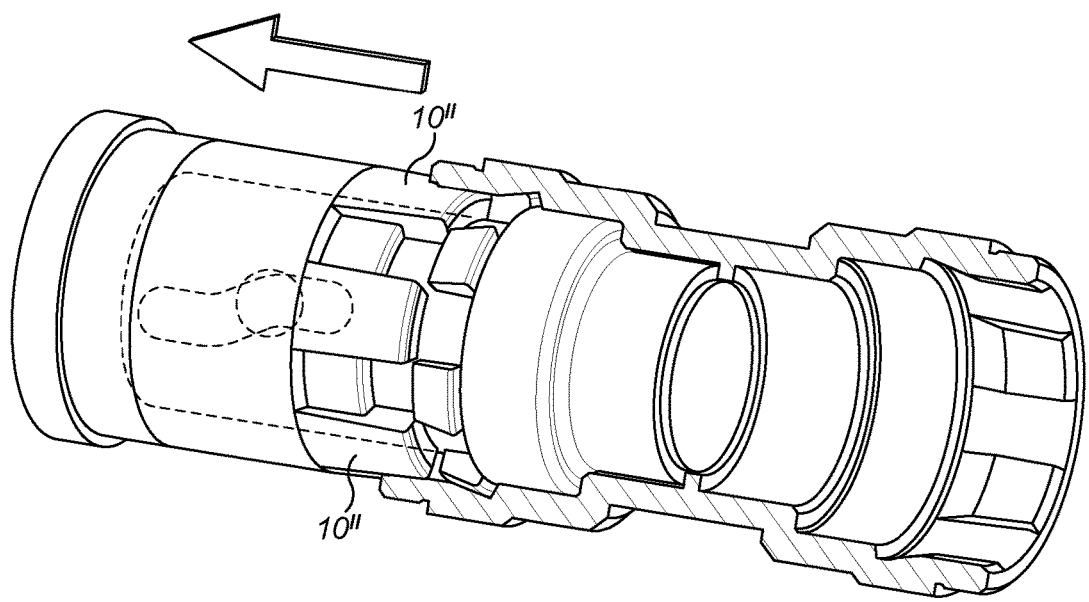
Figure 3D:
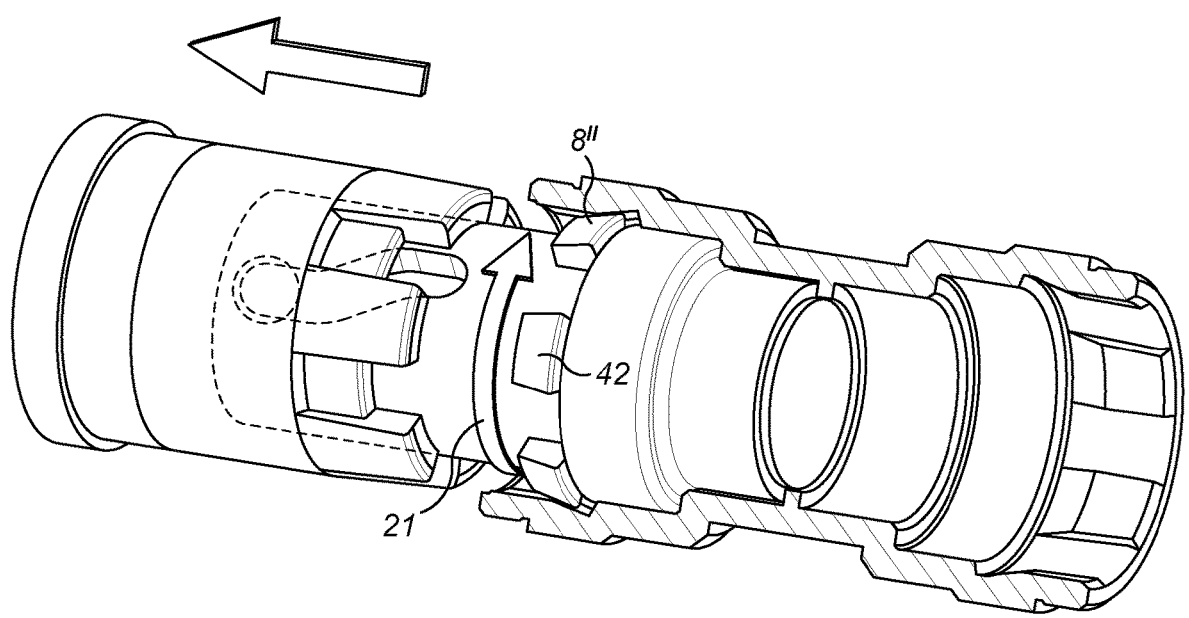
Figure 3E:
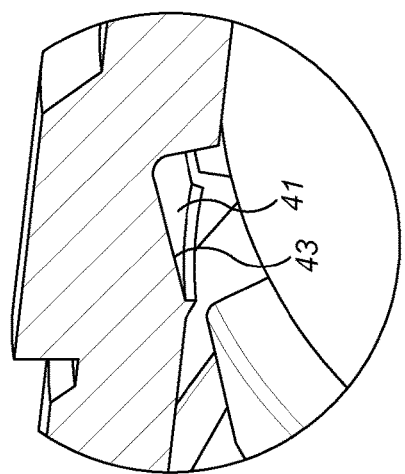
Figure 3F:
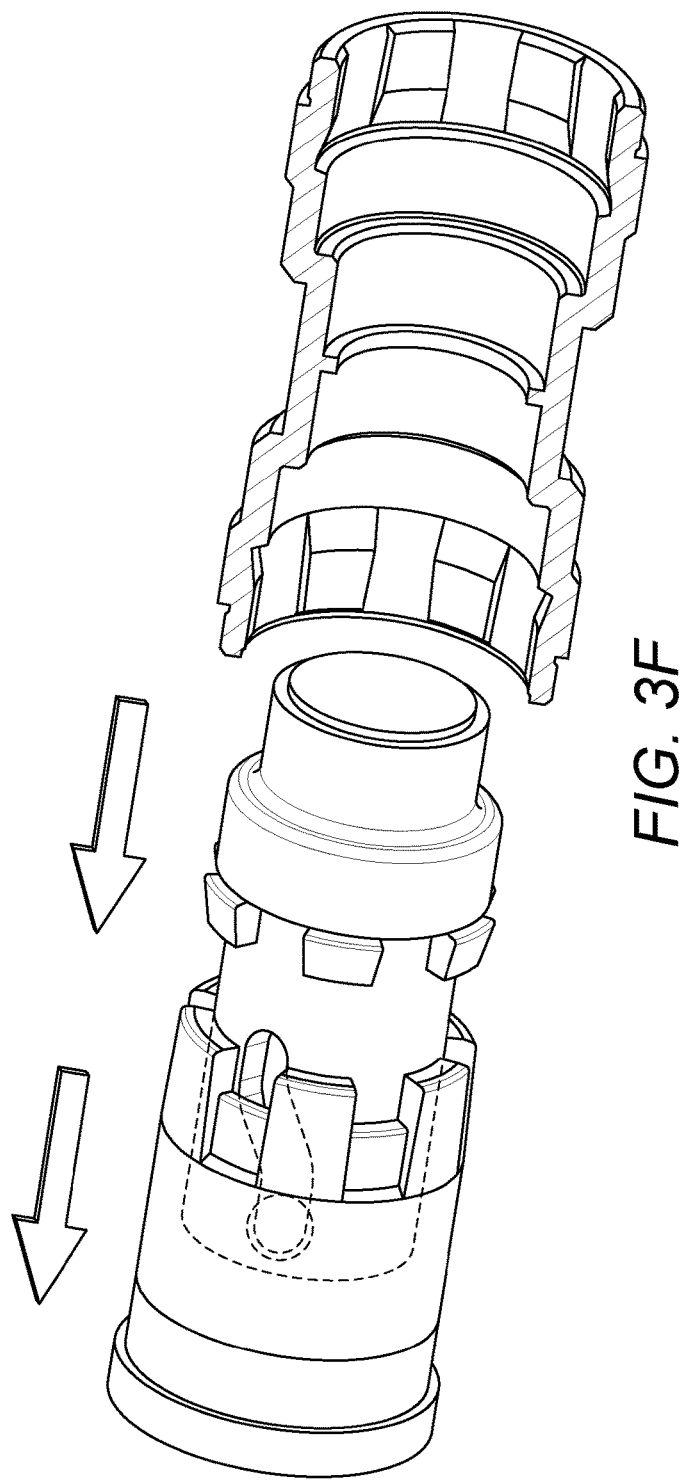

The first castellations 8" extend radially to a greater extent than the adjacent portion of the mold axially above and below the first castellations 8" in order to allow the deformation of the cavity 41. However, the second castellations 10" also extend to the same radial extent as the first castellations 8" to create a pathway to allow the first castellations 8" to be first rotated and then axially withdrawn as described below. The outer face 42 of each first castellation 8" is inclined to produce an inclined face 43 within the recess 41 as shown in FIG. 3E. This inclined face 43 represents the cap angle which, in the finished connector, will act on the fingers of the collet in order to cause it to grip a tube within the connector.

The relative rotation 21 between the axial core 2 and outer sleeve 3 this time causes the first castellations 8" to rotate into a position in which they are now in the regions formed by the second castellations 10" thereby allowing removal of the inner pin 1 from the body 40.

The invention claimed is:

1. A mold for molding a body or cap for a connector, the body or cap having a throughway defining an axis and, adjacent to one open end, in a radial plane, a plurality of first portions in which the inner wall has a first radius alternating with a plurality of second portions in which the inner wall has a second radius larger than the first radius;
   the mold comprising a mold body and an axial core which together define a mold cavity in the shape of the body or cap;
   the core having an outer sleeve and an inner pin, the pin having a distal end protruding axially from the outer sleeve and being provided with a plurality of first castellations, the sleeve having a plurality of second castellations which are complementary to the first castellations such that, in a first configuration, the first and second castellations interdigitate;
   wherein in the first configuration, the castellations are arranged such that a respective recess is formed bound by the proximal end of a first castellation and the side walls of adjacent second castellations, each recess having a shape to form a respective first portion of the body or cap;
   the outer sleeve and inner pin being axially movable relative to one another to a second configuration in which the first and second castellations are disengaged from one another;
   the inner pin being subsequently rotatable to a third configuration circumferentially offset from the first and second configurations in which the first castellations can be axially withdrawn from the body or cap following a path occupied by the second castellations in the first configuration.

2. A mold according to claim 1, wherein the first and second portions are formed at the open end, the first portions being inward projections and the second portions being gaps between the projections thereby defining an intermediate lip around the open end of the body or cap.

3. A mold according to claim 1, wherein the first portion represents a reduced inner diameter of the body or cap axially adjacent to recesses in the body or cap and the second portion is an increased inner diameter portion between the first portions to provide the path to withdraw the core.

4. A mold according to claim 1, wherein one of the outer sleeve and inner pin is provided with a cam groove and the other of the outer sleeve and inner pin is provided with a cam follower to allow the axial and rotational movement between the two.

5. A mold according to claim 1, wherein there is a cap on the end of the inner pin rotatable about the axis with respect to the inner pin.

6. A method for molding a body or cap for a connector using a mold, the body or cap having a throughway defining an axis and, adjacent to one open end, in a radial plane, a plurality of first portions in which the inner wall has a first radius alternating with a plurality of second portions in which the inner wall has a second radius larger than the first radius;
   the mold comprising a mold body and an axial core which together define a mold cavity in the shape of the body or cap;
   the core having an outer sleeve and an inner pin, the pin having a distal end protruding axially from the outer sleeve and being provided with a plurality of first castellations, the sleeve having a plurality of second castellations which are complementary to the first castellations such that, in a first configuration, the first and second castellations interdigitate;
   the method comprising molding the body or cap with the outer sleeve and inner pin in a first configuration in which, the castellations are arranged such that a respective recess is formed bound by the proximal end of a first castellation and the side walls of adjacent second castellations, each recess having a shape to form a respective first portion of the body or cap;
   moving the outer sleeve and inner pin axially relative to one another to a second configuration in which the first and second castellations are disengaged from one another;
and subsequently rotating inner pin to a third configuration circumferentially offset from the first and second configurations in which the first castellations can be axially withdrawn from the body or cap following a path.

\* \* \* \* \*

UNITED STATES PATENT AND TRADEMARK OFFICE
CERTIFICATE OF CORRECTION

| | | |
|---|---|---|
| PATENT NO. | : 11,787,095 B2 | Page 1 of 1 |
| APPLICATION NO. | : 17/415411 | |
| DATED | : October 17, 2023 | |
| INVENTOR(S) | : Glen Ansell | |

It is certified that error appears in the above-identified patent and that said Letters Patent is hereby corrected as shown below:

In the Claims

The last paragraph of Claim 6 should be:
and subsequently rotating inner pin to a third configuration circumferentially offset from the first and second configurations in which the first castellations can be axially withdrawn from the body or cap following a path occupied by the second castellations in the first configuration.

Signed and Sealed this
Sixth Day of May, 2025

Coke Morgan Stewart
*Acting Director of the United States Patent and Trademark Office*